United States Patent
Sandstrom et al.

(10) Patent No.: US 7,631,676 B2
(45) Date of Patent: Dec. 15, 2009

(54) TIRE WITH CENTRAL RUBBER LAYER REINFORCED WITH MICRO AND/OR MACRO REINFORCING FILLERS TO ABRIDGE SPLIT CARCASS PLY ENDS

(75) Inventors: Paul Harry Sandstrom, Cuyahoga Falls, OH (US); Ping Zhang, Hudson, OH (US); Joseph Kevin Hubbell, Akron, OH (US); James Joseph Golden, North Canton, OH (US); Robert Anthony Neubauer, Medina, OH (US); Keith Carl Trares, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 189 days.

(21) Appl. No.: 11/585,616

(22) Filed: Oct. 24, 2006

(65) Prior Publication Data

US 2008/0093003 A1    Apr. 24, 2008

(51) Int. Cl.
B60C 9/00      (2006.01)
B60C 9/18      (2006.01)

(52) U.S. Cl. .............. 152/526; 152/458; 152/532; 152/537

(58) Field of Classification Search ............. 152/526, 152/527, 528, 529, 530, 531, 532, 533, 534, 152/535, 536, 537, 538, 458
See application file for complete search history.

(56) References Cited

U.S. PATENT DOCUMENTS 3,827,991 A * 8/1974 Ando ................ 525/215
5,634,599 A    6/1997 Khais et al. .............. 241/23
5,883,139 A    3/1999 Wideman et al. ......... 521/43.5
6,305,452 B1   10/2001 Sato ..................... 152/555
6,797,757 B2   9/2004 Wideman et al. ......... 524/303
6,883,570 B2   4/2005 Jardine et al. ........... 152/531
6,883,571 B2   4/2005 Jardine et al. ........... 152/531
6,913,052 B2   7/2005 Losey .................. 152/551
7,017,635 B2   3/2006 Losey .................. 152/539
2005/0056967 A1 * 3/2005 Villani et al. ........... 264/326

FOREIGN PATENT DOCUMENTS

| DE | 1480958 | 10/1969 |
| EP | 1057659 A2 | 12/2000 |
| EP | 1433590 A2 | 6/2004 |
| EP | 1433624 A2 | 6/2004 |
| EP | 916522 | 7/2005 |
| JP | 10-157408 | * 6/1998 |

(Continued)

OTHER PUBLICATIONS

European Search Report completed Dec. 5, 2007.

*Primary Examiner*—Justin Fischer
(74) *Attorney, Agent, or Firm*—Henry C. Young, Jr.

(57) ABSTRACT

The invention relates to a tire having a split ply carcass member with the ends of the split carcass ply spaced apart in the central crown portion of the tire and a central rubber layer spanning the gap between the split carcass ply ends, wherein said central rubber layer is reinforced with at least one of micro and macro reinforcing fillers. Said central rubber layer may additionally contain continuous cord reinforcement.

5 Claims, 2 Drawing Sheets

FOREIGN PATENT DOCUMENTS

| | | | |
|---|---|---|---|
| JP | 2001191722 | | 7/2001 |
| JP | 2001-191722 | | 7/2002 |
| JP | 2005-81873 | * | 3/2005 |
| WO | WO 90/04617 | * | 5/1990 |
| WO | 02/00451 A1 | | 1/2002 |
| WO | 03/037656 A1 | | 5/2003 |
| WO | 03/037657 A1 | | 5/2003 |

* cited by examiner

US 7,631,676 B2

TIRE WITH CENTRAL RUBBER LAYER REINFORCED WITH MICRO AND/OR MACRO REINFORCING FILLERS TO ABRIDGE SPLIT CARCASS PLY ENDS

FIELD OF THE INVENTION

The invention relates to a tire having a split ply carcass member with the ends of the split carcass ply spaced apart in the central crown portion of the tire and a central rubber layer spanning the gap between the split carcass ply ends, wherein said central rubber layer is reinforced with at least one of micro and macro reinforcing fillers. Said central rubber layer may additionally contain continuous cord reinforcement.

BACKGROUND OF THE INVENTION

Pneumatic rubber tires are typically composed of a carcass of a ply construction where the carcass plies are composed of a rubber composition reinforced with continuous cords. Such cords may be composed of, for example, synthetic and/or natural filaments such as for example nylon, aramid, polyester and/or rayon filaments or may be composed of steel or coated steel filaments. Such rubber composition conventionally also contains a dispersion of reinforcing filler composed of particulate rubber reinforcing carbon black or a combination of rubber reinforcing carbon black and precipitated silica. The tire carcass conventionally supports a circumferential rubber tread which also contains a circumferential belt ply between the tire carcass and tread composed of, for example, a continuous cord reinforcement composed of, for example, a filamentary steel cord.

Such cord reinforced tire carcass plies and belt plies are well known to those having skill in such art.

Sometimes, tires having a carcass composed of split carcass plies have been proposed to provide a beneficial tire carcass construction such as, for example, a reduction on tire weight and cost. For example, see U.S. Pat. No. 7,017,635 particularly its FIGS. 7 and 9, U.S. Pat. Nos. 6,913,052, 6,883,571, 6,883,570 and 6,305,452 and European Patent Publication No. 916 522.

In said U.S. Pat. No. 7,017,635, a tire carcass composed of cord reinforced split plies is presented with a central ply spanning the gap between the split plies to abridge and join the split ply ends.

In FIG. 9 of U.S. Pat. No. 7,017,635, a tire is depicted with a carcass comprised of cord-reinforced split radial plies (17a) and (17b) with their ply ends spaced apart from each other with an overlying belt ply (24) and, also, an additional flat ply (50) positioned below the split plies (17a) and (17b) and thereby below the belt ply (24) and spanning the gap between the split plies.

For this invention, it is proposed to provide a tire with cord-reinforced split radial plies having their split ply ends abridged and joined by at least one circumferential central rubber layer which abridges (and thereby joins) the split ply ends by overlapping and/or underlapping the split ply ends. The central rubber layer contains a dispersion of macro and/or micro reinforcement. Optionally, said central rubber layer may also contain continuous cord reinforcement.

A significant aspect of such abridging rubber layer, Which spans the gap between the split carcass ends, is considered herein to be the inclusion of macro and micro reinforcement in its rubber composition. This is considered herein to be significant in a sense of simplifying the tire manufacturing process through the elimination of the calendering procedure for the preparation of rubber coated ply cords.

A further significant aspect of such abridging rubber layer, which spans the gap between the split carcass ends, is considered herein to be an optional additional inclusion of continuous cord reinforcement in its rubber composition. This is considered herein to be significant in a sense of further enhancing the reinforcing characteristics of the center ply, hence enhancing the performance of the tire.

The split ply tire carcass is comprised of at least two cord reinforced carcass plies having their ply ends spaced apart in the crown portion (central portion) of the tire carcass. The said carcass ply ends are joined by at least one central rubber layer which abridges and overlaps and/or underlaps the said carcass ply ends.

For example, the central rubber layer abridges the gap between the split carcass ends by being positioned radially outward from, and thereby overlapping and joining the carcass split ply ends.

For a further example, the central rubber layer abridges (spans) the gap between the split carcass ends by being positioned radially inwardly from, and thereby underlapping and joining, the carcass split ply ends.

For an additional example, the two central rubber layers, namely a first and second central rubber layer, abridge the gap between the split carcass ends wherein the first central rubber layer is positioned radially outward from, and thereby overlapping and joining, the carcass split ply ends and the second central rubber layer is positioned radially inward from, and thereby underlapping and joining, the carcass split ply ends. Optionally said first and second central rubber layers are in contact with each other to form a unitized configuration within the gap between the split carcass ends.

The central rubber layer composition is comprised of a rubber composition which contains a dispersion of macro and/or micro reinforcing fillers either to the exclusion of internal continuous cord reinforcement or in combination with internal continuous cord reinforcement.

Such macro reinforcement is, for example, comprised of short synthetic and/or natural filaments including cords comprised of a plurality of such filaments. Representative of such synthetic and/or natural filaments are, for example, nylon, aramid, polyester, glass, steel, coated steel and/or rayon filaments.

Such micro reinforcement is, for example, comprised of at least one polymer selected from syndiotactic polybutadiene, and a poly alpha-olefin such as for example, ultra high molecular weight polyethylene (UHMWPE), polypropylene, polybutene and poly 4-methyl-1-pentene, in addition to at least one of particulate rubber reinforcing carbon black and synthetic amorphous precipitated silica.

A significant aspect of such abridging (spanning the gap between the split carcass ply ends) central rubber layer is considered herein as providing support to the gap between the split carcass ply ends in a sense of promoting supportive durability to the split carcass ply (e.g. promoting a continuation of the carcass ply across the gap between its split ply ends) and, further to promote additional strength for the gap between the carcass split ply ends with an inclusion of continuous cord reinforcement within the macro and/or micro reinforced central rubber layer.

In the description of this invention, the terms "rubber" and "elastomer" where used herein, are used interchangeably, unless otherwise prescribed. The terms "rubber composition", "compounded rubber" and "rubber compound", where used herein, are used interchangeably to refer to "rubber which has been blended or mixed with various ingredients" and the term "compound" relates to a "rubber composition"

unless otherwise indicated. Such terms are well known to those having skill in the rubber mixing or rubber compounding art.

In the description of this invention, the term "phr" refers to parts of a respective material per 100 parts by weight of rubber, or elastomer. The terms "cure" and "vulcanize" are used interchangeably unless otherwise indicated.

The term "melting point", or "MP", of a polymer refers to a melting point of a polymer determined by DSC (differential scanning calorimeter) at a heating rate of 10° C. per minute, an analytical procedure well known to those having skill in such art.

SUMMARY AND PRACTICE OF THE INVENTION

In accordance with this invention, a tire is provided comprised of an outer circumferential rubber tread with a supporting underlying carcass, wherein said carcass contains at least one circumferential cord reinforced (reinforced with embedded continuous individual cords) belt ply underlying said rubber tread (radially inward of said tread) and at least one split carcass ply underlying said belt ply (radially inward of said belt ply) composed of a pair of cord reinforced rubber carcass ply elements wherein the split ply ends of said split carcass ply elements are spaced apart from each other in the central, crown portion of the tire, wherein at least one central rubber layer spans the gap between said split carcass ply ends; wherein:

(A) the central rubber layer spans the gap between said split carcass ply ends and overlays the radially outer surface of said split carcass ply elements, or (B) the central rubber layer spans the gap between said split carcass ply ends and underlays the radially inner surface of said split carcass ply elements, or (C) a first and second central rubber layer which both span the gap between said split carcass ply ends, wherein:
  (1) said first central rubber layer overlays the radially outer surface of said split carcass ply elements, and
  (2) said second central rubber layer underlays the radially inner surface of said split carcass ply elements;
wherein the rubber composition of said central rubber layer(s) contains a dispersion of:
  (3) reinforcing fillers comprised of at least one of rubber reinforcing carbon black and synthetic amorphous particulated silica, and
  (4) at least one of:
    (a) macro reinforcing filler, and
    (b) micro reinforcing filler;
wherein said central rubber layer(s):
  (5) exclude internal continuous cord reinforcement, or
  (6) include internal continuous cord reinforcement;
wherein said macro reinforcing fillers are composed of short fibers comprised of at least one of synthetic and natural fibers;

wherein said micro reinforcing fillers are comprised of at least one of syndiotactic polybutadiene having a melting point (MP) in a range of from about 170° C. to about 225° C. and additional poly alpha-olefins (in addition to said syndiotactic polybutadiene) having a melting point (MP) in a range of from about 80° C. to about 180° C. (comprised of, for example, at least one of ultra high molecular weight polyethylene (UHMWPE), polypropylene, poly 1-butene and poly 4-methyl-1-pentene).

Preferably, the rubber composition of said abridging rubber layer contains from about 1 to about 30, alternately from about 2 to about 25, phr of said at least one of said macro and said additional micro reinforcing fillers such as, for example, from zero to about 30, alternately from about 1 to about 25, phr of said macro reinforcing filler dispersion and from zero to about 30, alternately from about 1 to about 25, phr of said additional micro reinforcing filler, based upon parts by weight per 100 parts by weight of the rubber (phr) of said rubber composition.

In practice, said short fibers for said macro reinforcing filler may be selected from natural and/or synthetic fibers such as, for example, at least one of nylon, polyester, rayon, aramid, cellulose and cotton. Said short fibers may preferably be comprised of at least one of nylon, cellulose, polyester and aramid.

In practice, said short fibers for said macro reinforcing filler may have an average length in a range of from about 0.05 to about 1 inch (about 1.3 to about 25 mm), alternately from about 0.1 to about 0.5 inches (about 2.5 to about 13 mm).

Said short fibers may be, for example, in a form of a chopped cord of a plurality of fibers (e.g. a cord of a plurality of fibers which has been chopped into short lengths).

Rubber reinforcing carbon black and/or precipitated silica filler is used in an amount ranging from about 30 to about 100 phr for the rubber composition of the central rubber layer.

In practice, a circumferential cord reinforced rubber belt ply is positioned radially outward of said split carcass ply elements and said abridging central rubber layer and between said split carcass ply elements and said circumferential rubber tread.

In practice the rubber composition of said abridging central rubber layer is comprised of at least one diene-based elastomer selected from polymers and copolymers of isoprene and 1,3-butadiene and copolymers of styrene and at least one of isoprene and 1,3-butadiene.

Representative elastomers for the rubber composition of said central rubber layer are, for example, styrene-butadiene copolymers (whether prepared by organic solvent solution polymerization or by aqueous emulsion polymerization), isoprene/butadiene copolymers, styrene/isoprene/butadiene terpolymers and tin coupled organic solution polymerization prepared styrene/butadiene copolymers, cis 1,4-polyisoprene and cis 1,4-polybutadiene.

Preferred elastomers are natural cis 1,4-polyisoprene rubber, styrene/butadiene rubber and cis 1,4-polybutadiene rubber.

Representative rubber reinforcing carbon blacks for the rubber composition of said central rubber layer may be referred to by their ASTM designations such as for example for tread rubber compositions, although not intended to be limitive, N110, N121 and N234. Other rubber reinforcing carbon blacks may found, for example, in *The Vanderbilt Rubber Handbook* (1978), Page 417.

BRIEF DESCRIPTION OF THE DRAWING

Figures (FIG. 1, FIG. 2 and FIG. 3) are provided to further illustrate the invention as a cross-section of a portion of a tire showing a tread with a belt ply underlying the tread and a cord reinforced split carcass ply underlying the belt ply composed of two split carcass ply elements having their split ply ends spaced apart in the central crown portion of the tire with an associated central rubber layer spanning the gap between the ends of the split carcass ply elements and overlapping, to thereby join, the split carcass ply ends and associated elements Further, figures (FIG. 4 and FIG. 5) are provided to depict the central rubber layer.

THE DRAWING

Figure 1:
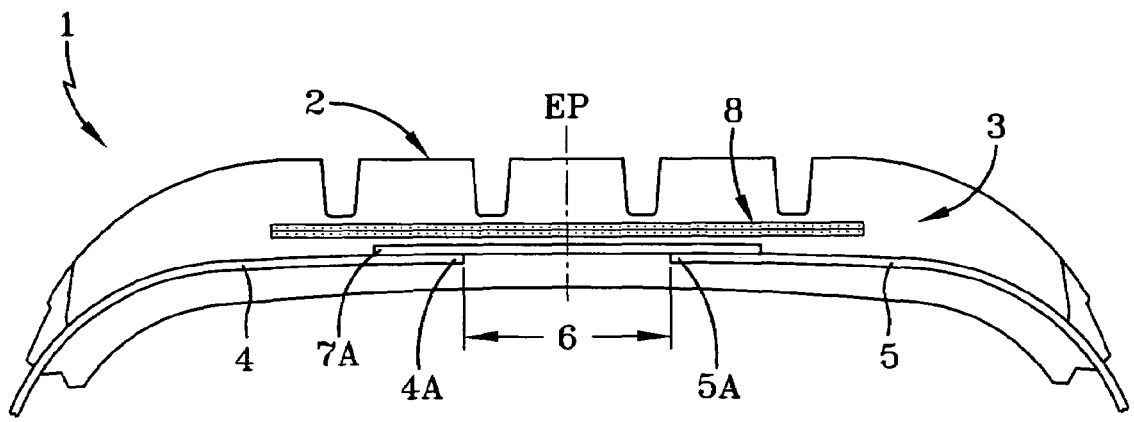
Figure 2:
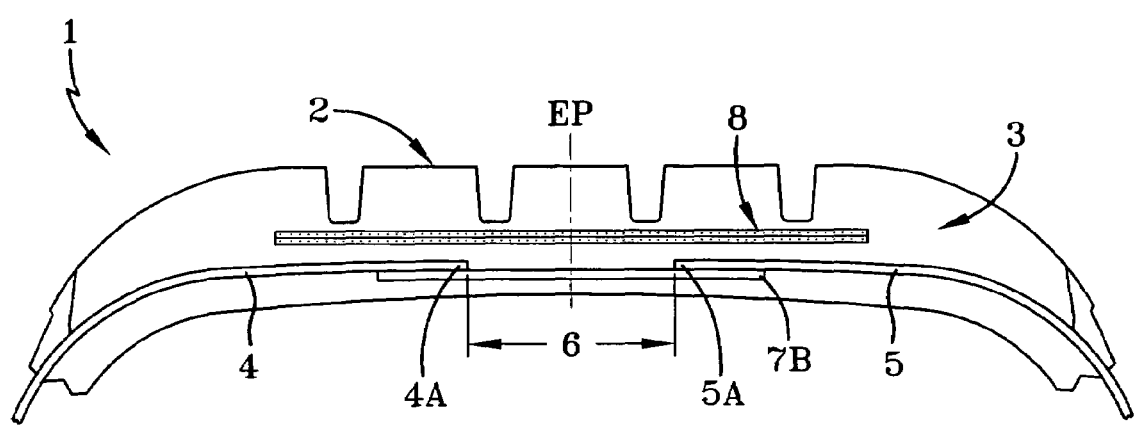
Figure 3:
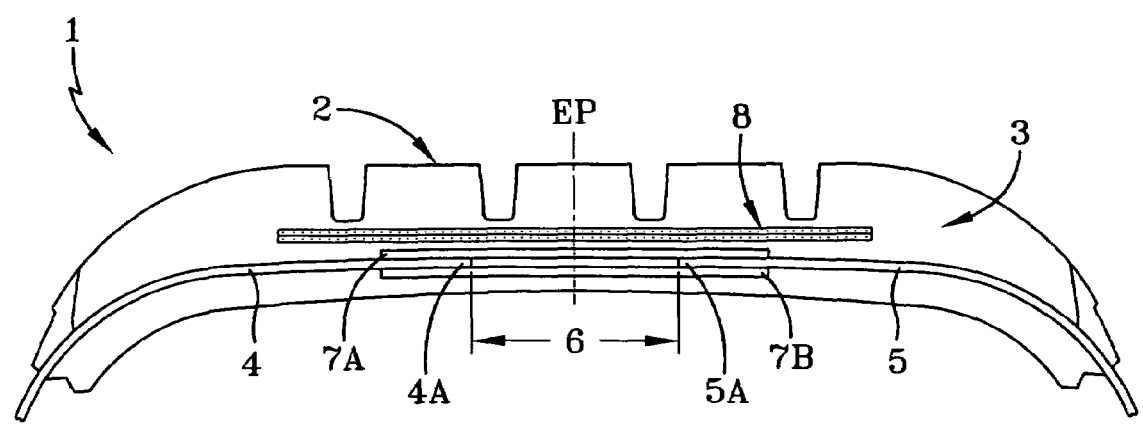

In FIG. 1, FIG. 2 and FIG. 3, a simplified cross-section of a portion of a pneumatic tire (1) is shown with a circumferential tread (2) and an underlying carcass (3), identified in only a general way by an arrow in the drawing, together with a continuous cord reinforced split carcass ply composed of two continuous cord reinforced split carcass ply elements (4) and (5) with their split carcass ply ends (4A) and (5A) spaced apart from each other in the central crown portion of the tire with a resulting gap (6) between said split carcass ply ends (4A) and (5A), at least one central rubber layer overlay (7A) or underlay (7B) and a circumferential continuous cord reinforced belt ply (8) underlying said tread (2), (and positioned radially outward of said split carcass ply elements in the crown portion of the tire).

FIG. 1 depicts said tire (1) with a central rubber layer overlay (7A) which spans the gap (6) between the split carcass ply ends (4A) and (5A) and overlaps the radially outer surfaces of split carcass ply elements (4) and (5) and split carcass ply ends (4A) and (5A).

FIG. 2 depicts said tire (1) with a central rubber layer underlay (7B) which spans the gap (6) between the split carcass ply ends (4A) and (5A) and underlaps the radially inner surfaces of split carcass ply elements (4) and (5) and split carcass ply ends (4A) and (5A).

FIG. 3 depicts said tire (1) with a first central rubber layer overlay (7A) and second central rubber layer underlay (7B), respectively, which, both span the gap (6) between the split carcass ply ends (4A) and (5A), respectively, and;

wherein the first central rubber layer (7A) overlays the radially outer surfaces of said split carcass ply elements (4) and (5) and split carcass ply ends (4A) and (5A) and wherein the second central rubber layer (7B) underlays the radially inner surfaces of said split carcass ply elements (4) and (5) and split carcass ply ends (4A) and (5A).

Figure 4:
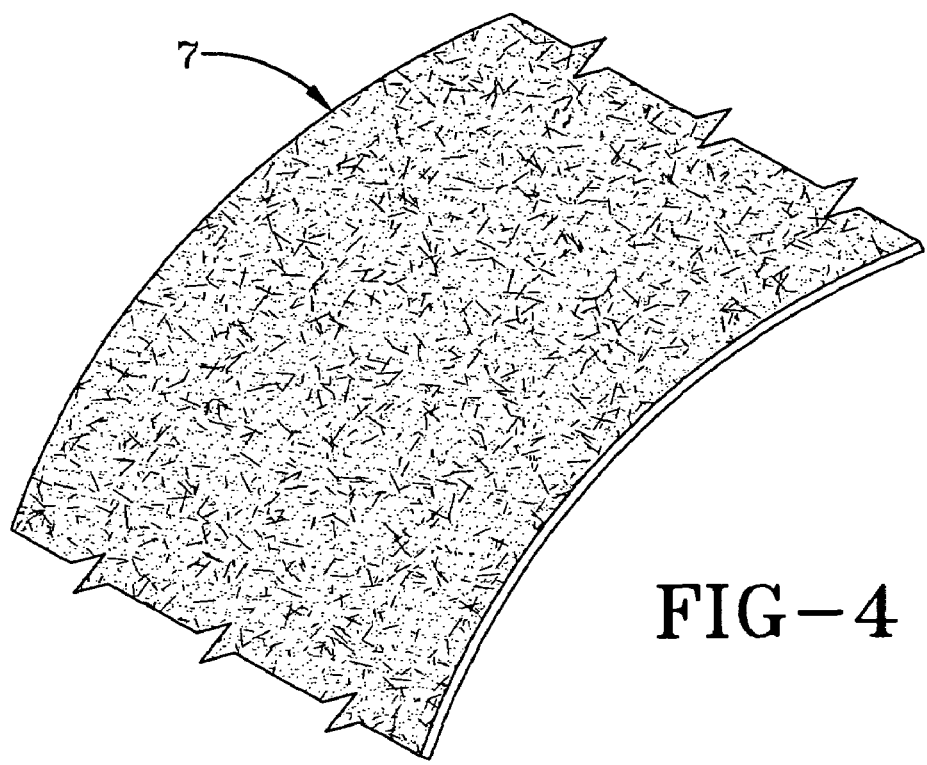
Figure 5:
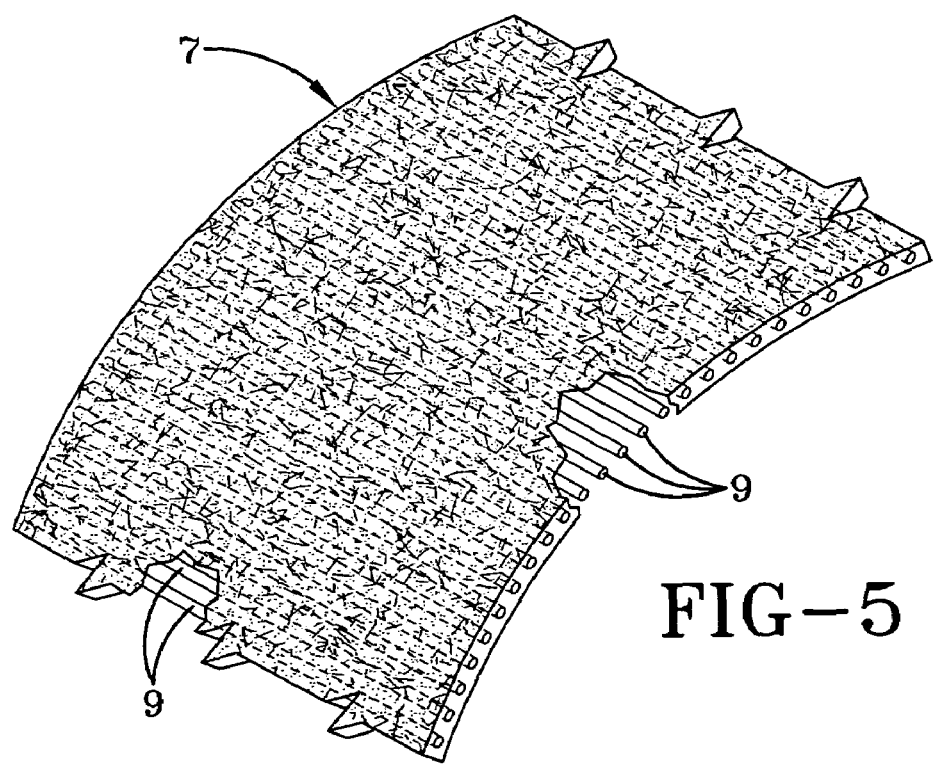

In FIG. 4 and FIG. 5, central rubber layer(s) (7) is depicted.

In particular, FIG. 4 depicts a first central rubber layer variation (7) which contains a uniform dispersion of a combination of macro reinforcing filler and said micro reinforcing filler, exclusive of continuous cord reinforcement.

In particular, FIG. 5 depicts a second central rubber layer variation (7) which contains a uniform dispersion of a combination of macro reinforcing filler and said micro reinforcing filler together with continuous cord reinforcement (9).

The preparation of a tire carcass ply, including said split carcass plies, may be accomplished by conventional means such as, for example, by calendering procedures which are well known to those having skill in such art or by other procedures as may be appropriate.

It is readily understood by those having skill in the pertinent art that the rubber composition for the various tire components, including said split carcass plies and abridging rubber layer which spans the gap between said split carcass ply ends, would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, microcrystalline waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The vulcanization is conducted in the presence of a sulfur vulcanizing agent. Examples of suitable sulfur vulcanizing agents may include, for example, elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents might be used in an amount ranging from, for example, about 0.5 to about 4 phr, more typically from about, for example, about 2 to about 2.5 phr.

Vulcanization accelerators are used to control the time and/or temperature required for vulcanization and to improve the properties of the vulcanizate. Sometimes a single accelerator system may be used, i.e., primary accelerator. More typically, various combinations of primary and secondary accelerators might be used with the secondary accelerator being used in smaller amounts (of about 0.05 to about 3 phr) in order to activate and to improve the properties of the vulcanizate. Combinations of these accelerators might produce a synergistic effect on the final properties and are thereby usually somewhat better than those produced by use of either accelerator alone. In addition, delayed action accelerators may be used which are not particularly affected by normal processing temperatures but produce a more satisfactory cure at higher vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. The primary accelerator may often be a sulfenamide. If a second accelerator is used, the secondary accelerator is usually preferably a guanidine, dithiocarbamate or thiuram compound.

The mixing of the rubber composition can be accomplished by a sequential mixing process comprised of at least one non-productive mixing step followed by a productive mixing step. For example, the ingredients may be mixed in two or more (sometimes at least three mixing stages), namely, at least one non-productive (preparatory) stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

The following Examples are presented to further illustrate the invention. The parts and percentages are by weight unless otherwise indicated.

EXAMPLE I

Rubber samples of rubber compositions which contain a micro reinforcement for use for an abridging rubber layer for the split ply tire carcass of this invention (to span the gap between split carcass ply ends in the crown portion of the tire) is prepared and identified herein as Control Sample A and experimental Samples B and C which contain UHMWPE micro reinforcement as reported in Table 2.

The basic formulation for the rubber Samples in this and following Examples is presented in the following Table 1.

TABLE 1

| Material | Sample |
|---|---|
| First Non-Productive Mixing (NP-1) | |
| Natural cis 1,4-polyisoprene rubber[1] | 80 |
| Emulsion SBR rubber[2] | 20 (with 7.5 phr oil) |
| Carbon black[3] | 41 |
| Free (additional) rubber processing oil[4] | 2.5 |
| Zinc oxide | 3 |
| Antidegradant[5] | 1 |
| Polyoctenamer (Micro, Example III)[6] | variable; 0-20 |
| Ultra High MW Polyethylene (Micro, Ex I)[7] | variable; 0-20 |
| Cellulose (Macro, Example II)[8] | variable, 0-12 |
| Polyaramid pulp (Macro, Example III)[9] | variable; 0-4 |
| Productive mixing (PR) | |
| Sulfur | 3 |
| Accelerators (curing aids)[10] | 1.5 |

[1]Natural cis 1,4-polyisoprene rubber (SMR-20)
[2]Copolymer of butadiene and styrene rubber as Plioflex ™ 1778 from the Goodyear Tire & Rubber Company
[3]Rubber reinforcing carbon black as N299, an ASTM designation
[4]Rubber processing oil
[5]Quinoline type
[6]Polyoctenamer as Vestenamer 8012 from the Degussa Company
[7]Ultra high molecular weight polyethylene (UHMWPE) as GUR4120 from the Ticona company having an average molecular weight of about 5,000,000 mol/g.
[8]Cellulose in a form of surface treated fiber as Santoweb D ™ from the Flexsys Company.
[9]Polyaramid pulp in a form of a natural rubber masterbatch as GF 722 from the DuPont Company
[10]Accelerators as sulfenamide types The rubber Samples were prepared by mixing the elastomers(s) together with reinforcing fillers and other rubber compounding ingredients in a first non-productive mixing stage (NP-1) in an internal rubber mixer for about 4 minutes to a temperature of about 160° C. The resulting rubber composition is then mixed in a productive mixing stage (PR) in an internal rubber mixer with sulfur curatives for about 2 minutes to a temperature of about 110° C. The rubber composition is sheeted out and cooled to below 40° C. between the non-productive mixing and the productive mixing steps.

The following Table 2 illustrates cure behavior and various physical properties of the rubber Samples. Where a cured rubber sample was evaluated, such as for the stress-strain, rebound, hardness, tear strength and abrasion measurements, the rubber sample was cured for about 23 minutes at a temperature of about 170° C.

TABLE 2

| | Samples | | |
|---|---|---|---|
| | Control A | B | C |
| Micro reinforcement, HMWPE (phr) | 0 | 10 | 20 |
| Mooney viscosity, ML(1 + 4) at 100° C. | 88 | 101 | 100 |
| Rheometer, MDR[1], 160° C., 30 min | | | |
| Maximum torque (dNm) | 18.8 | 19 | 18.6 |
| Minimum torque (dNm) | 3.1 | 3.7 | 3.7 |
| T90 (minutes) | 4.4 | 4.5 | 4.8 |
| Stress-strain, ATS, ring tensile, 23 min, 170° C.[2] | | | |
| Tensile strength (MPa) | 18.7 | 16.5 | 16 |
| Elongation at break (%) | 468 | 392 | 366 |
| 100% modulus (MPa) | 1.7 | 2.6 | 3.4 |
| 300% modulus (MPa) | 10.8 | 13.1 | 14.2 |
| Rebound | | | |
| 23° C. | 54 | 54 | 55 |
| 100° C. | 68 | 68 | 68 |
| Shore A Hardness | | | |
| 23° C. | 62 | 68 | 71 |
| 100° C. | 59 | 65 | 67 |
| RPA test, 11 Hz, 100° C.[3] | | | |
| Uncured G' at 15% strain (MPa) | 0.26 | 0.31 | 0.33 |
| Modulus G' at 1% strain (MPa) | 2.2 | 2.6 | 3.0 |
| Modulus G' at 14% strain (MPa) | 1.4 | 1.7 | 1.9 |
| Tan delta at 10% strain | 0.10 | 0.09 | 0.10 |
| Green Strength, with grain, at 23° C.[4] | | | |
| 80% stress (MPa) | 0.33 | 0.35 | 0.43 |
| 240% stress (MPa) | 0.54 | 0.40 | 0.52 |
| 480% stress (MPa) | 0.58 | 0.50 | 0.68 |
| Maximum stress (MPa) | 0.68 | 0.89 | 0.89 |
| Maximum strain (%) | 1012 | 1210 | 987 |
| Tear Strength, 95° C., Newtons[5] | 84 | 70 | 71 |

[1]Data obtained according to Moving Die Rheometer instrument, model MDR-2000 by Alpha Technologies, used for determining cure characteristics of elastomeric materials, such as for example Torque, T90 etc.
[2]Data obtained according to Automated Testing System instrument by the Instron Corporation which incorporates six tests in one system. Such instrument may determine ultimate tensile, ultimate elongation, moduli, etc.
[3]Data according to Rubber Process Analyzer as RPA 2000 ™ instrument by Alpha Technologies, formerly the Flexsys Company and formerly the Monsanto Company
[4]Data according to stress-strain analysis of uncured rubber composition.
[5]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.

From Tables 2 it can be seen that the compound Shore A hardness and stiffness (100% and 300% moduli) of Samples B and C were significantly enhanced, as compared to Control Sample A, from the introduction of ultrahigh molecular weight polyethylene into the compound (rubber composition).

This is considered herein to be significant in a sense that ultrahigh molecular weight polyethylene provided some reinforcement to the rubber compound as a rubber layer of Samples B and C spanning the gap between split ply ends of a split ply carcass in the crown portion of a tire and overlaying and/or underlaying the split ply ends.

From Tables 2 it can be seen that hysteretic properties (e.g. tan delta at 100° C.) of the compound (Samples B and C) were similar to those of Control Sample A and therefore considered herein as not being significantly affected from the addition of ultrahigh molecular weight polyethylene into the compound.

This is considered herein to be significant in a sense that maintaining the hysteretic properties of the rubber composition would substantially maintain the heat build up property (e.g. not significantly increase the heat built up during the running of the tire) of the rubber composition as well as the rolling resistance performance, of a tire containing an rubber layer of Samples B and C spanning the gap between split ply ends of a split ply carcass in the crown portion of a tire and overlaying and/or underlaying the split ply ends.

EXAMPLE II

Rubber samples of rubber compositions which contain a macro reinforcement for use for an abridging rubber layer for the split carcass ply of this invention (to span the gap between the carcass split ply ends) is prepared and identified herein as Control Sample D and experimental Samples E, F and G which contain cellulose macro reinforcement as reported in Table 3.

The basic formulation for the rubber Samples is presented in Table 1 of Example I.

TABLE 3

|  | Samples | | | |
| --- | --- | --- | --- | --- |
|  | Control D | E | F | G |
| Macro reinforcement, cellulose (phr) | 0 | 4 | 8 | 12 |
| Stress-strain, ATS, ring tensile, 23 min, 170° C.[2] | | | | |
| Tensile strength (MPa) | 12.3 | 9.7 | 11.2 | 9.3 |
| Elongation at break (%) | 414 | 345 | 366 | 304 |
| 100% modulus (MPa) | 1.5 | 2.1 | 2.9 | 3.7 |
| 300% modulus (MPa) | 8.3 | 9.1 | 9.8 | — |
| Rebound | | | | |
| 23° C. | 51 | 51 | 50 | 51 |
| 100° C. | 60 | 61 | 61 | 62 |
| Shore A Hardness | | | | |
| 23° C. | 59 | 62 | 65 | 69 |
| 100° C. | 56 | 58 | 61 | 66 |
| RPA test, 1 Hz, 100° C.[3] | | | | |
| Uncured G' at 15% strain (MPa) | 0.26 | 0.27 | 0.28 | 0.29 |
| Modulus G' at 1% strain (MPa) | 1.7 | 1.8 | 1.9 | 1.9 |
| Modulus G' at 50% strain (MPa) | 0.7 | 0.8 | 0.8 | 0.8 |
| Tan delta at 10% strain | 0.11 | 0.11 | 0.11 | 0.10 |
| Green Strength, with grain, at 23° C.[4] | | | | |
| 80% stress (MPa) | 0.36 | 0.45 | 0.58 | 0.86 |
| 240% stress (MPa) | 0.40 | 0.57 | 0.69 | 0.98 |
| 480% stress (MPa) | 0.52 | 0.77 | 0.88 | 1.26 |
| Maximum stress (MPa) | 1.14 | 1.39 | 1.28 | 1.71 |
| Maximum strain (%) | 1140 | 995 | 950 | 918 |
| Tear Strength, 95° C., Newtons[5] | 119 | 110 | 93 | 44 |

The superscript numbers refer to the same measurement methodology used in Example I.

From Tables 3 it can be seen that the compound Shore A hardness and stiffness (100% and 300% moduli) were significantly enhanced from the introduction of cellulose fiber into the compound.

This is considered herein to be significant in a sense that cellulose fiber provided some reinforcement to the rubber compound.

From Tables 3 it can be seen that hysteretic properties (e.g. tan delta at 100° C.) of the Samples E, F and G, as compared to Control Sample D, were not significantly affected by the addition of cellulose fiber into the compound.

This is considered herein to be significant in a sense that maintaining the hysteretic properties of the rubber composition would substantially maintain the heat build up property (e.g. not significantly increase the heat built up during the running of the tire) of the rubber composition as well as the rolling resistance performance, of a tire containing an rubber layer of Samples E, F and G spanning the gap between split ply ends of a split ply carcass in the crown portion of a tire and overlaying and/or underlaying the split ply ends.

From Table 3 it also can be seen that the green strength of the compound was significantly enhanced for Samples E, F and G, as compared to Control Sample D, by the addition of cellulose fiber into the compound.

This is considered herein to be significant in a sense that the increased green strength would improve the tire building process for the green, uncured tire prior to the shaping and curing step for the tire.

EXAMPLE III

Rubber samples of rubber compositions which contain micro and macro reinforcements for use in the abridging rubber layer for the split carcass ply of this invention (to span the gap between the carcass split ply ends in the crown portion of the tire) is prepared and identified herein as Control Sample H and experimental Samples I and J for polyoctenamaer micro reinforcement and K and L for aramid macro reinforcement as reported in Table 4.

The basic formulation for the rubber Samples is presented in Table 1 of Example I.

TABLE 4

|  | Samples | | | | |
| --- | --- | --- | --- | --- | --- |
|  | Control H | I | J | K | L |
| Micro reinforcement, polyoctenamer (phr) | 0 | 10 | 20 | 0 | 0 |
| Macro reinforcement, aramid (phr) | 0 | 0 | 0 | 2 | 4 |
| Stress-strain, ATS, ring tensile, 23 min, 170° C.[2] | | | | | |
| Tensile strength (MPa) | 13.2 | 9.3 | 10.2 | 10.9 | 11 |
| Elongation at break (%) | 415 | 337 | 376 | 319 | 303 |
| 100% modulus (MPa) | 1.5 | 1.5 | 1.5 | 3.2 | 4.4 |
| 300% modulus (MPa) | 9 | 6.6 | 8.1 | 11.3 | 12.2 |
| Rebound | | | | | |
| 23° C. | 52 | 55 | 56 | 51 | 50 |
| 100° C. | 62 | 63 | 64 | 63 | 62 |
| Shore A Hardness | | | | | |
| 23° C. | 56 | 55 | 53 | 65 | 67 |
| 100° C. | 52 | 55 | 57 | 51 | 50 |

TABLE 4-continued

|  | Samples | | | | |
| --- | --- | --- | --- | --- | --- |
|  | Control H | I | J | K | L |
| RPA test, 1 Hz, 100° C.[3] | | | | | |
| Uncured G' at 15% strain (MPa) | 0.26 | 0.23 | 0.19 | 0.32 | 0.32 |
| Modulus G' at 1% strain (MPa) | 1.8 | 1.5 | 1.3 | 2.2 | 2.2 |
| Modulus G' at 50% strain (MPa) | 0.8 | 0.8 | 0.7 | 1.0 | 1.0 |
| Tan delta at 10% strain | 0.11 | 0.10 | 0.09 | 0.10 | 0.10 |
| Green Strength, with grain, at 23° C.[4] | | | | | |
| 80% stress (MPa) | 0.33 | 0.49 | 0.65 | 0.65 | 1.64 |
| 240% stress (MPa) | 0.33 | 0.59 | 0.74 | 1.23 | 2.49 |
| 480% stress (MPa) | 0.39 | 0.76 | 0.95 | 1.60 | 2.94 |
| Maximum stress (MPa) | 1.02 | 1.44 | 1.73 | 1.91 | 2.96 |
| Maximum strain (%) | 1363 | 1103 | 1073 | 763 | 587 |
| Tear strength, 95° C., Newtons[5] | 111 | 109 | 77 | 136 | 137 |

The superscript numbers refer to the same measurement methodology used in Example I.

From Tables 4 it can be seen that the compound Shore A hardness and stiffness (100% and 300% moduli) were significantly enhanced from the introduction of aramid fiber into the compound.

This is considered herein to be significant in a sense that aramid fiber provided some reinforcement to the rubber compound.

From Tables 4 it can be seen that hysteretic properties (e.g. tan delta at 100° C.) of Samples I, J, K and L, as compared to Control Sample H, were not significantly affected by the addition of polyoctenamer or aramid fiber into the respective rubber Samples.

This is considered herein to be significant in a sense that maintaining the hysteretic properties of the rubber composition would substantially maintain the heat build up property (e.g. not significantly increase the heat built up during the running of the tire) of the rubber composition as well as the rolling resistance performance, of a tire containing an rubber layer of Samples I, J, K and L spanning the gap between split ply ends of a split ply carcass in the crown portion of a tire and overlaying and/or underlaying the split ply ends.

From Table 4 it also can be seen that the green strength of the compound was significantly enhanced from the addition of polyoctenamer and aramid fiber into the compound for Samples I, J, K and L, as compared to Control Sample H.

This is considered herein to be significant in a sense that increased green strength would improve the tire building process for the green, uncured tire prior to the shaping and curing step for the tire.

EXAMPLE IV

Rubber samples of rubber compositions which contain micro and macro reinforcement for use in an abridging rubber layer for the split ply tire carcass of this invention (to span the gap between the carcass split ply ends) is prepared and identified in this Example as Control Sample M (with a combination of natural rubber and emulsion SBR) and Control Sample N (with natural rubber) and experimental Samples O and P (corresponding to Control Samples M and N, respectively) which contain cellulose macro reinforcement as reported in Table 6.

The basic formulation for the rubber samples is presented in the following Table 5.

TABLE 5

| Material | Sample |
| --- | --- |
| First Non-Productive Mixing (NP-1) | |
| Natural cis 1,4-polyisoprene rubber[1] | 100 or 80 |
| Emulsion SBR rubber[2] | 0 or 20 (with 7.5 phr oil) |
| Carbon black[3] | 41 |
| Free (additional) rubber processing oil[4] | 10 or 2.5 |
| Zinc oxide | 3 |
| Antidegradant[5] | 1 |
| Cellulose[8] | 0 or 12 |
| Productive mixing (PR) | |
| Sulfur | 3 |
| Accelerators (curing aids)[10] | 1.5 |

The superscript numbers refer to the same measurement methodology used in Example I.

TABLE 6

|  | Samples | | | |
| --- | --- | --- | --- | --- |
|  | Control M | Control N | O | P |
| Natural rubber | 80 | 100 | 80 | 100 |
| Emulsion SBR rubber | 20 | 0 | 20 | 0 |
| Macro reinforcement cellulose (phr) | 0 | 0 | 12 | 12 |
| Rheometer, MDR[1], 170° C., 30 min | | | | |
| Maximum torque (dNm) | 17.2 | 15.6 | 18.7 | 17 |
| Minimum torque (dNm) | 2.8 | 2.5 | 3.1 | 3 |
| T90 (minutes) | 2.4 | 1.6 | 2.5 | 1.7 |
| Stress-strain, ATS, ring tensile, 32 min, 150° C.[2] | | | | |
| Tensile strength (MPa) | 12.5 | 13.7 | 8.5 | 7.9 |
| Elongation at break (%) | 405 | 510 | 280 | 312 |
| 100% modulus (MPa) | 1.5 | 1.1 | 3.9 | 3.1 |
| 300% modulus (MPa) | 8.9 | 6.2 |  | 6.9 |
| Rebound | | | | |
| 23° C. | 50 | 53 | 50 | 52 |
| 100° C. | 64 | 62 | 63 | 61 |
| Shore A Hardness | | | | |
| 23° C. | 61 | 57 | 70 | 66 |
| 100° C. | 54 | 50 | 65 | 60 |

TABLE 6-continued

| | Samples | | | |
|---|---|---|---|---|
| | Control M | Control N | O | P |
| RPA test, 11 Hz, 100° C.[3] | | | | |
| Uncured modulus t 15% strain (MPa) | 0.25 | 0.24 | 0.27 | 0.25 |
| Modulus G' at 1% strain (MPa) | 2.9 | 2.5 | 3.3 | 3 |
| Modulus G' at 10 strain (MPa) | 1.45 | 1.20 | 1.6 | 1.4 |
| Tan delta at 10% strain | 0.10 | 0.10 | 0.10 | 0.11 |
| Green Strength, with grain, at 23° C.[4] | | | | |
| 80% stress, (modulus), (MPa) | 0.27 | 0.27 | 0.57 | 0.53 |
| 240% stress, (modulus), (MPa) | 0.29 | 0.58 | 0.72 | 0.71 |
| 480% stress, (modulus), (MPa) | 0.28 | | 0.76 | 0.79 |
| Maximum stress (tensile strength), (MPa) | 0.61 | 0.57 | 0.95 | 0.97 |
| Maximum strain, (elongation), (%) | 2478 | 455 | 1307 | 957 |
| Tear Strength, 95° C., Newtons[5] | 78 | 153 | 49 | 107 |
| Cord adhesion, 23° C., Newtons[6] | 87 | 96 | 115 | 121 |
| Cord adhesion, 121° C., Newtons[6] | 149 | 165 | 150 | 145 |

[6]Data obtained by measuring force in Newtons for a cord pull-out test of the cords embedded in the cured rubber composition.
The superscript numbers refer to the same measurement methodology used in Example I.

From Table 6 it can be seen that the combination of all-NR and macro cellulose reinforcement for Sample P, as compared to the rubber blend and macro cellulose reinforcement for Sample O, led to a significant enhancement of the tear strength of the compound.

From Table 6 it also can be seen that the 23° C. cord adhesion of the Samples O and P, as compared to Control Samples M and N, respectively, was maintained or improved by the incorporation of the macro cellulose fiber into the rubber compound.

This is considered herein to be significant in a sense that the macro cellulose-containing compound can be used in combination with fiber cords for further enhancement of the strength of the rubber layer composed of Samples O and M spanning the gap between split ply ends of a split ply carcass in the crown portion of a tire and overlaying and/or underlaying the split ply ends.

While certain representative embodiments and details have been shown for the purpose of illustrating the subject invention, it will be apparent to those skilled in this art that various changes and modifications can be made therein without departing from the scope of the subject invention.

What is claimed is:

1. A tire comprised of an outer circumferential rubber tread with a supporting underlying carcass, wherein said carcass contains at least one circumferential continuous cord reinforced belt ply underlying said rubber tread and at least one split carcass ply underlying said belt ply composed of a pair of cord reinforced rubber carcass ply elements, wherein the split ply ends of said split carcass ply elements are spaced apart from each other in the central, crown portion of the tire, wherein at least one central rubber layer spans the gap between said split carcass ply elements and overlays the radially outer surface of the split carcass ply ends of said split carcass ply elements;

wherein the rubber composition of said central rubber layer contains a dispersion of:

A reinforcing fillers comprised of 30 to 100 phr of rubber reinforcing carbon black and synthetic amorphous precipitated silica, and B from about 2 to about 30 phr of a combination of macro and micro reinforcing fillers comprised of:

(1) from about 1 to about 25 phr of macro reinforcing filler, and (2) from about 1 to about 25 phr of micro reinforcing filler;

wherein said central rubber layer excludes continuous cord reinforcement wherein said macro reinforcing fillers consist of short fibers comprised of at least one of synthetic and natural fibers;

wherein said micro reinforcing filler is comprised of particulate syndiotactic polybutadiene having a melting point (MP) in a range of from 170° C. to 225° C.

2. The tire of claim 1 wherein the average length of said macro reinforcing fibers is in a range of from about 1.3 to about 25 mm.

3. The tire of claim 1 wherein the fibers for said macro reinforcing filler are selected from at least one of nylon, polyester, rayon, fiberglass, aramid, cellulose and cotton fibers.

4. The tire of claim 1 wherein the fibers for said macro reinforcing filler are selected from nylon, cellulose, polyester and aramid fibers.

5. The tire of claim 1 wherein elastomers for the rubber composition of said central rubber layer are comprised of at least one of natural cis 1,4-polyisoprene rubber, styrene/butadiene rubber and cis 1,4-polybutadiene rubber.

* * * * *